United States Patent
Ahmed et al.

(10) Patent No.: US 7,685,411 B2
(45) Date of Patent: Mar. 23, 2010

(54) MULTI-MODE INSTRUCTION MEMORY UNIT

(75) Inventors: Muhammad Ahmed, Austin, TX (US);
Lucian Codrescu, Austin, TX (US);
Erich Plondke, Austin, TX (US);
William C. Anderson, Austin, TX (US);
Robert Allan Lester, Round Rock, TX (US); Phillip M. Jones, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 11/104,115

(22) Filed: Apr. 11, 2005

(65) Prior Publication Data

US 2006/0230259 A1     Oct. 12, 2006

(51) Int. Cl.
*G06F 9/00* (2006.01)
(52) U.S. Cl. ........................ 712/241; 712/239
(58) Field of Classification Search ................ 712/239, 712/208, 211, 241
See application file for complete search history.

(56) References Cited

U.S. PATENT DOCUMENTS

| | | | |
|---|---|---|---|
| 5,623,615 A | | 4/1997 | Salem et al. |
| 5,734,881 A | | 3/1998 | White et al. |
| 6,125,440 A | * | 9/2000 | Osovets .................. 712/205 |
| 6,233,676 B1 | * | 5/2001 | Henry et al. ............ 712/233 |
| 6,256,728 B1 | * | 7/2001 | Witt et al. ............... 712/236 |
| 6,959,379 B1 | * | 10/2005 | Wojcieszak et al. ...... 712/241 |

OTHER PUBLICATIONS

Matthew C. Merten and Wen-Mei W. Hwu, Modulo Schedule Buffers, 2001 IEEE, 138-149. 1072-4451/01, Center for Reliable and High-Performance Computing, University of Illinois, Urbana, IL 61801.
Lea Hwang Lee, Bill Moyer John Arends, Instruction Fetch Energy Reduction Using Loop Caches for Embedded Applications with Small Tight Loops, M-Core Technology Center, Motorola, Inc., P.O. Box 6000, MD TX77/F51, Austin, Texas 78762-6000.

* cited by examiner

*Primary Examiner*—Alford W Kindred
*Assistant Examiner*—Benjamin P Geib
(74) *Attorney, Agent, or Firm*—Nicholas J. Pauley; Peter Kamarchik; Sam Talpalatsky

(57) ABSTRACT

An instruction memory unit comprises a first memory structure operable to store program instructions, and a second memory structure operable to store program instructions fetched from the first memory structure, and to issue stored program instructions for execution. The second memory structure is operable to identify a repeated issuance of a forward program redirect construct, and issue a next program instruction already stored in the second memory structure if a resolution of the forward branching instruction is identical to a last resolution of the same. The second memory structure is further operable to issue a backward program redirect construct, determine whether a target instruction is stored in the second memory structure, issue the target instruction if the target instruction is stored in the second memory structure, and fetch the target instruction from the first memory structure if the target instruction is not stored in the second memory structure.

28 Claims, 3 Drawing Sheets

US 7,685,411 B2

MULTI-MODE INSTRUCTION MEMORY UNIT

BACKGROUND

I. Field of the Invention

The present disclosure pertains generally to digital signal processors, and more specifically to an instruction queue and method of operation.

II. Background

Digital signal processors are specialized microprocessors that are capable of executing operations with speed. Digital signal processors (DSPs) are commonly embedded in a variety of devices such as mobile telephones, personal digital assistants, and portable computing systems. The reduction of power consumption in these portable and mobile devices is an important design goal in order to maximize battery life. As functionality for these mobile devices expand to include multimedia and graphics applications, power consumption has become one of the most significant design and implementation considerations.

SUMMARY

A consideration for reducing power consumption in digital signal processors is the energy used in the instruction memory unit when instructions are fetched from memory, instruction cache and instruction queue for execution, and when the fetched instructions are predecoded and decoded. Because digital signal processor programs typically spend the majority of time executing program loops, this characteristic may be exploited to reduce power consumption by the instruction memory unit.

In one aspect of an embodiment, a method comprises issuing a backward program redirect construct containing a backward branch path from an instruction queue, determining whether the backward branch path is being taken, determining whether a target instruction indicated by the backward branch path is already stored in the instruction queue in response to the backward branch path is being taken, issuing the target instruction from the instruction queue in response to it being already stored in the instruction queue, and fetching the target instruction from an instruction cache coupled to the instruction queue in response to the target instruction not already stored in the instruction queue.

In another aspect of an embodiment, a method comprises issuing a forward program redirect construct containing a forward branch path from an instruction queue, determining whether a last resolution of the forward program redirect construct reaches the same result as a current resolution of the forward program redirect construct, and issuing a next instruction from the instruction queue in response to same result being reached by the last and current resolution of the forward program redirect construct.

In yet another aspect of an embodiment, an instruction memory unit comprises a first memory structure operable to store program instructions, a second memory structure coupled to the first memory structure and operable to store program instructions fetched from the first memory structure, and operable to issue stored program instructions for execution. The second memory structure is operable to identify a repeated issuance of a forward branch instruction, and issue a next program instruction already stored in the second memory structure in response to a resolution of the forward branching instruction identical to a last resolution of the same forward branching instruction. The second memory structure is further operable to issue a backward branch instruction stored in the second memory structure, determine whether a target instruction thereof is stored in the second memory structure, issue the target instruction in response to the target instruction is stored in the second memory structure, and fetch the target instruction from the first memory structure in response to the target instruction not stored in the second memory structure.

Therefore, program loop executions are "captured" so that program loops may be executed from the instruction queue without having to fetch instructions out of the instruction cache for every iteration of the loop. As the instruction queue is much smaller than the instruction cache, significant power savings and speed may be achieved by avoiding the instruction cache during these program loop iterations. Further, because instructions in the instruction queue are already predecoded, there is additional power savings in not using the instruction decoding logic for program loop execution during instruction queue operating mode. As described above, the operation of the instruction memory unit in instruction queue or instruction cache operating mode does not require any software code in the program instructions to provide advanced notice to the instruction memory unit that a program loop execution is forthcoming and that special loop execution may take place.

DESCRIPTION OF SPECIFIC EMBODIMENTS

Because the reduction of power consumption has become a vital design goal for mobile devices, design engineers are looking at all aspects of the device for opportunities to minimize total power use. One area of opportunity is the power consumed by the digital signal processor, and more specifically the power consumed by the digital signal processor during program loop execution. Digital signal processors may spend over 80% of the time executing program loops. These program loops may be of various sizes but most are small program loops containing fewer than ten program instructions, for example. When the number of times a loop is executed is deterministic such as a FOR loop, the zero-overhead loop construct is typically used. When the number of loop iteration is unknown such as a WHILE loop, a backward branch instruction is typically used. The instruction memory unit described herein and operation thereof exploit these digital signal processor execution characteristics to reduce power consumption and increase execution speed.

Figure 1:
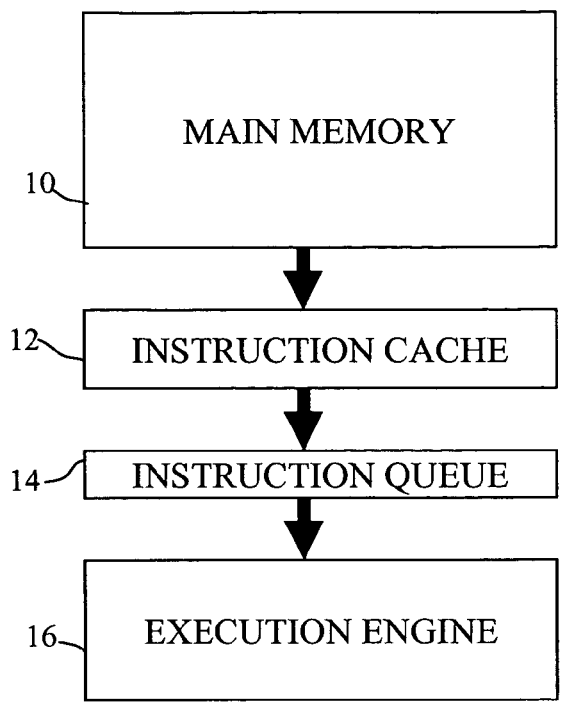
FIG. 1 is a simplified block diagram of an embodiment of an instruction memory architecture of a digital signal processor.

FIG. 1 is a simplified block diagram of an embodiment of an instruction memory unit of a digital signal processor. The digital signal processor includes a main memory 10 where program instructions reside. In order to improve processing speed, an instruction buffering scheme is used. An instruction cache (I$) 12 with faster access speed is used to store instructions fetched from the main memory 10. An instruction queue (IQ) 14, with an even faster access speed, is used to queue up program instructions that will be immediately executed in an execution engine 16. Typically, the instruction queue 14 has a smaller storage capacity than the instruction cache 12, and even smaller storage capacity than the main memory 10. The power consumption of the instruction queue 14 during memory access is generally less than that of the instruction cache 12 and the main memory 10. The execution engine 16 may be a processor that specializes in arithmetic computations such as a digital signal processor. In one embodiment, the execution engine 16 may support interleaved multi-threading to take advantage of high clock speed and maximum core and memory utilization.

Figure 2A:
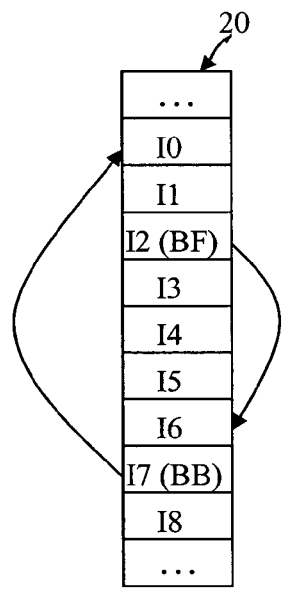
FIG. 2A is a diagrammatical representation of exemplary contents of a portion of a main memory containing instructions I0 to I8.

FIG. 2A is a diagrammatical representation of exemplary contents of a portion 20 of the main memory 10 containing instructions I0 to I8. Of these instructions, instruction I2 is a forward program redirect construct, such as a conditional forward branch instruction or a jump forward instruction with a positive offset. For simplicity, all program redirect constructs that have a forward path are hereinafter referred to as forward program redirect constructs. The forward program redirect construct, I2, jumps to instruction I6 if a predetermined condition is met. Instruction I7 is a conditional backward branch instruction, a jump instruction with a negative offset, or a zero overhead loop. For simplicity, all program redirect instructions that has a backward path are hereinafter referred to as a backward program redirect construct. The backward program redirect construct I7 jumps back to instruction I0 if a predetermined condition is met. Other instructions, I0, I1, I3 through I6, and I8 are sequential instructions where execution of these instructions leads to the next instruction in memory.

The instruction memory unit may operate in at least two modes: instruction cache mode and instruction queue mode. During the instruction cache mode, the instruction to be executed must be fetched from the instruction cache 12 into the instruction queue 14. During the instruction queue operating mode, the instructions to be executed are already loaded into the instruction queue 14 from the instruction cache 12, such as during iterations of a loop so that access to the instruction cache may be avoided. This strategy speeds up the operation of the instruction memory unit, and reduces power consumption by the instruction memory unit. Details of the operating modes of the instruction memory unit are set forth below.

Figure 2B:
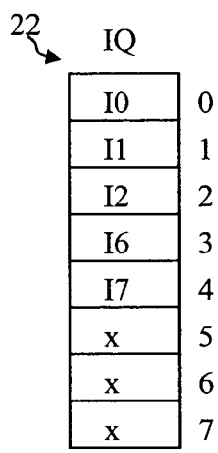
FIG. 2B-D are diagrammatical representations of exemplary contents of an embodiment of an instruction queue (IQ) during three instruction execution scenarios.
Figure 2C:
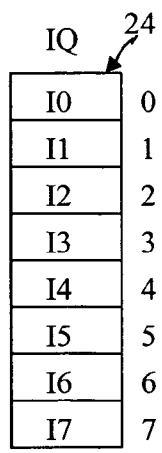
Figure 2D:
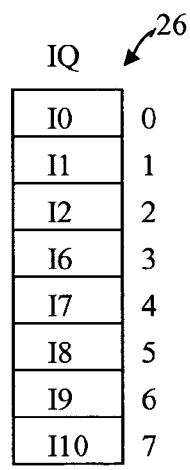
Figure 3:
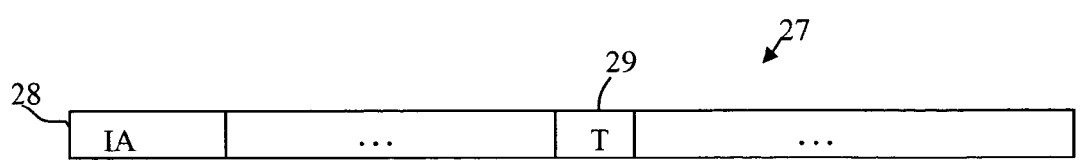
FIG. 3 is an exemplary format of an embodiment of an instruction queue address.

FIGS. 2B-D are diagrammatical representations of exemplary contents of an embodiment of an instruction queue during three instruction execution scenarios. In FIG. 2B, the instruction queue 14 has been loaded with contents 22 including instructions with the conditional forward branch being taken as the execution path. Therefore, I6 is loaded into the instruction queue 14 immediately after I2. Referring also to FIG. 3, an exemplary instruction queue address and control portion 27 of an instruction queue entry is shown. The instruction queue address and control format 27 may include an instruction address (LA) field 28 and a T-bit field 29. A program counter maintains the address of the current instruction address during execution. The T-bit may be used to indicate whether a forward branch was taken. The T-bit is updated during forward program redirect construct resolution. Therefore, when I6 is loaded into the instruction queue entry 3, the T-bit is set for entry 2 where the forward program redirect construct is stored. Instruction I7 is then loaded into entry 4. When instruction I7 is issued, the backward branch is taken. This causes a lookup for instruction I0 in the instruction queue 14. Because instruction I0 is in the instruction queue 14, the instruction memory unit is put into an instruction queue operation mode where the needed instructions are already loaded into the instruction queue 14 and no access to the instruction cache 12 is necessary. The instruction queue is simply sequentially read to obtain the next instructions, as indicated by an instruction queue read pointer that is sequentially incremented. When instructions I0, I1, and then I2 are executed again, if the branch forward path is taken again, execution jumps to the next instruction in the instruction queue 14 in entry 3, which is I6.

If in this iteration the branch forward path is not taken but was taken in the prior iteration as indicated by a T-bit that is set, then execution leaves the instruction queue mode and returns to an instruction cache mode. The T-bit is reset to indicate that the current branch is not taken. The sequential instructions after instruction I2, instructions I3 through I7 are loaded into entries 3 through 7 of the instruction queue 14, as shown by the contents 24 of the instruction queue shown in FIG. 2C. When instruction I7, a conditional backward branch, is issued, a look up is done to determine whether the target instruction is in the instruction queue 14. Since instruction I0 is already in the instruction queue, execution enters into instruction queue operating mode. If at instruction I2 the forward branch path is taken this time, the instruction memory unit enters into instruction cache operating mode since the T-bit for entry 2 indicates that branch forward was not taken the previous time. The T-bit is now set. Once again, instruction I6 is loaded into entry 3 and instruction I7 is loaded into entry 4, as shown by the instruction queue contents 26 in FIG. 2D. If the backward branch path of instruction I7 is not taken, the instruction memory unit operating mode stays in the instruction cache mode, and I8 is loaded into entry 5 of the instruction queue from the instruction cache. Similarly, instructions I9 and I10 are loaded into entries 6 and 7 of the instruction queue.

If the backward branch path of instruction I7 is not taken while the operating mode is in the instruction queue mode, then the operating mode becomes the instruction cache mode and instructions I8 through I10 are also loaded into the instruction queue from the instruction cache.

If at FIG. 2D the backward branch path of instruction I7 is taken while the operating mode is in the instruction cache mode, then the operating mode becomes the instruction queue mode and the instruction queue is as shown in FIG. 2B.

Figure 4:
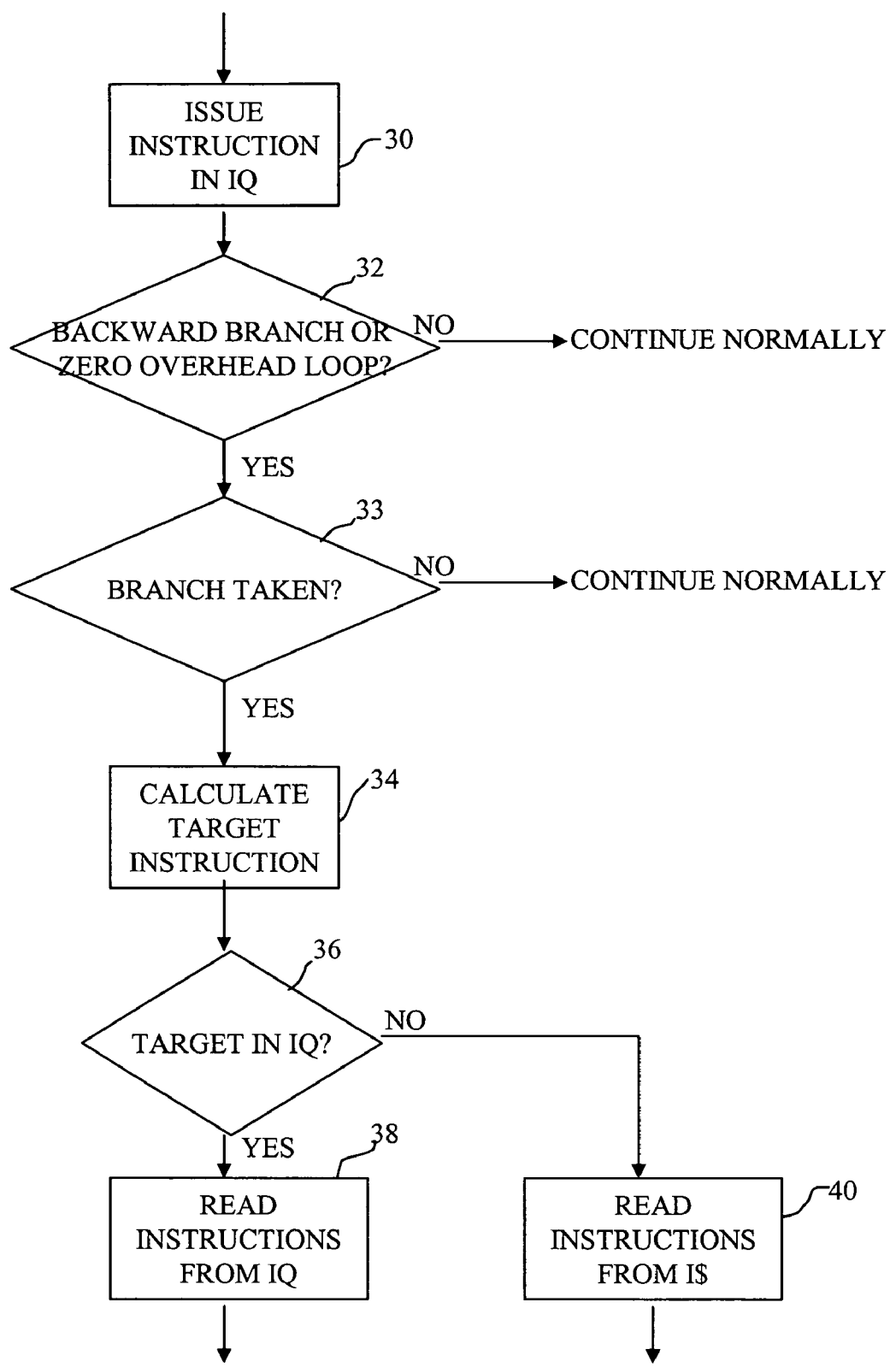
FIG. 4 is a flowchart of an embodiment of a method of instruction queue operations when backward branching or zero overhead loop is encountered.
Figure 5:
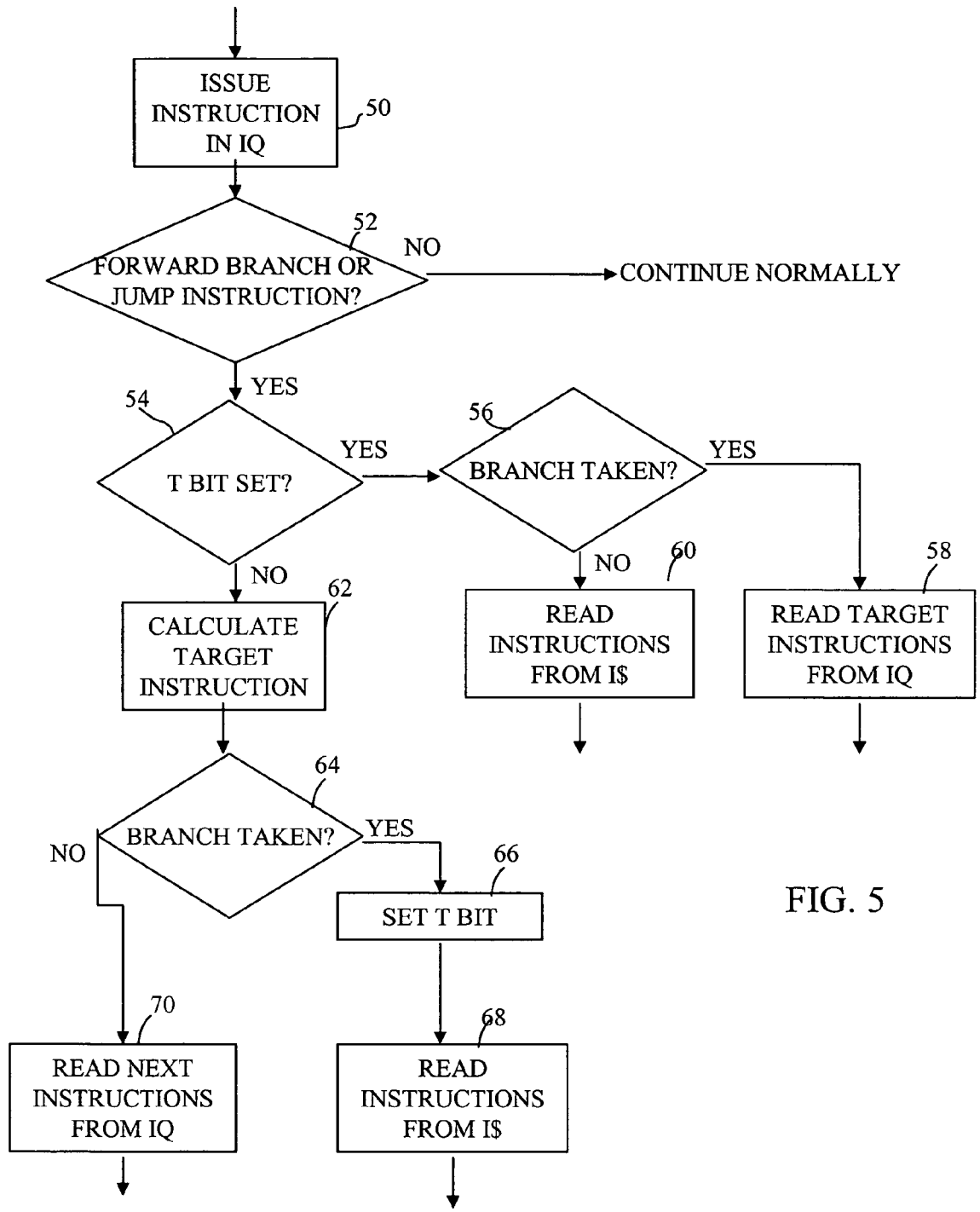
FIG. 5 is a flowchart of an embodiment of a method of instruction queue operations when forward branching or jump is encountered.

FIG. 4 is a flowchart of an embodiment of a method of instruction queue operations when a backward program redirect construct is encountered. In block 30, an instruction is fetched or issued from the instruction queue 14. In block 32, a determination is made as to whether that instruction is a backward branch with an immediate offset or zero overhead loop instruction. If not, execution continues normally in the instruction cache operating mode. A check may be made at this time to determine if the issued instruction is a forward program redirect construct, as shown in FIG. 5, if this has not already been done. If the instruction is a backward program redirect construct and the branching path is taken, as determined in block 33, then a determination is made as to what the target instruction for the instruction is in block 34. In block 36, a determination is made as to whether the target instruction is already in the instruction queue. If the target instruction is not in the instruction queue, then the instruction is read from the instruction cache in block 40, and the instruction memory unit operating mode is instruction cache mode. If the target instruction is in the instruction queue, then the target instruction is the next instruction to be issued in block 38.

FIG. 5 is a flowchart of an embodiment of a method of instruction queue operations when a forward program redirect construct is encountered. In general, a forward loop is "captured" if a prior resolution of a forward program redirect construct results in the same manner as the present forward branch resolution. In other words, if the current forward program redirect construct resolution generates the same result as the last resolution, then the instructions needed for program execution are already in the instruction queue, and access to the instruction cache is not needed. No lookup in the instruction queue is required.

Referring to FIG. 5, in block 50 an instruction is read from the instruction cache 12 and stored in the instruction queue 14 during the instruction cache operating mode. A determination is made as to whether that instruction is a forward program redirect construct in block 52. If not, execution continues normally. A check may be made at this time to determine if the issued instruction is a backward program redirect construct, as shown in FIG. 4, if this has not already been done. If the issued instruction is a forward program redirect construct, then a determination of whether the T-bit in its instruction queue address is set is made in block 54. If the T-bit is set, then it means that the previous time this instruction was issued, the forward branch path was taken. If the forward branch is again taken this time, as determined in block 56, then the target instruction should already be in the instruction queue and issued in block 58. The instruction memory unit continues to operate in the instruction queue operating mode. If the forward branch is not taken this time, then the T-bit is reset and the next instruction to be issued is read from the instruction cache in block 60, and the instruction memory unit operates in the instruction cache operating mode.

If the T-bit is not set, as determined in block 54, then during the previous pass the forward branch path was not taken. The target instruction for the present forward program redirect construct is resolved in block 62. In block 64, a determination is made as to whether the forward branch path is being taken this time. If the forward branch is being taken, then the T-bit of the instruction queue address of the forward program redirect construct is set in block 66. The target instruction is then read from the instruction cache in block 68. This execution path results because the previous forward branch path was not taken (as indicated by the T-bit) and then taken this time. Therefore, the instruction queue does not contain the needed instructions and must be fetched from the instruction cache. If in block 64 it is determined that the forward branch path is not being taken this time, then the next instruction is already in the instruction queue, which is issued in block 70. This execution path results because the previous forward branch path was not taken (as indicated by the T-bit) and then also not taken this time. Therefore, the instruction queue already contains the needed instructions. Therefore, if the current and last resolution of the forward program redirect construct is identical and the instruction memory unit is operating in the instruction queue mode, then the next set of instructions are already in the instruction queue, which may be accessed by sequentially incrementing the instruction queue read pointer. During the instruction queue operating mode, no access to the instruction cache is necessary and significant savings in power consumption and greater speed are possible. If the current resolution is different from the previous resolution or if there is a program redirection instruction other than the forward program redirect construct, then the instruction memory unit transitions out of the instruction queue mode and into the instruction cache mode. The instruction cache is then accessed to fetch the target instruction.

Although not described herein, one or more pointers may be used to note the location(s) of instruction queue entries to issue and load instructions during the processes shown in FIGS. 4 and 5 and described above. The term "main memory" is used herein to refer to a memory device or structure that is used as the main storage for program instructions. The term "instruction cache" is used herein to refer to a memory device or structure that possesses a faster access speed than main memory and is of a smaller size than the main memory. The term "instruction queue" is used herein to refer to a memory device or structure that possesses a faster access speed than the instruction cache and is of a smaller size than the instruction cache. Although the invention is described herein in the context of a main memory-instruction cache-instruction cache three-tiered hierarchy, this invention may be extended to embodiments having two-tiered or multi-tiered instruction memory hierarchy. Although the instruction queue 14 is shown to have a storage size of eight entries, this invention should not be so limited. The logic or code module associated with the processes shown in FIGS. 4 and 5 may reside in the instruction queue or in read-only memory or other memory structures of the digital signal processor.

It may be seen from the foregoing that program loop executions are "captured" so that program loops may be executed from the instruction queue without having to fetch instructions out of the instruction cache for every iteration of the loop. As the instruction queue is much smaller than the instruction cache, significant power savings and speed may be achieved by avoiding the instruction cache during these program loop iterations. Further, because instructions in the instruction queue are already predecoded, there is additional power savings in not using the instruction decoding logic for program loop execution during instruction queue operating mode. As described above, the operation of the instruction memory unit in instruction queue or instruction cache operating mode does not require any software code in the program instructions to provide advanced notice to the instruction memory unit that a program loop execution is forthcoming and that special loop execution may take place.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method of issuing a next instruction of a program, the method comprising:

issuing a forward program redirect construct from an instruction queue, wherein the forward program redirect construct is to select a current path from one of a first sequential path and a forward branch path, wherein a number of loop iterations associated with the program is unspecified prior to execution of the program;

determining whether the current path is identical to the previous path, wherein determining comprises:

establishing that a T-bit field of the forward program redirect construct is set in response to the forward branch path selected previously; and issuing a next instruction from the instruction queue when the current path is identical to a previous path selected by the forward program redirect construct.

2. The method of claim 1, further comprising setting the T-bit field of the forward program redirect construct when the forward branch path is selected.

3. The method of claim 1, wherein the next instruction is predecoded.

4. The method of claim 1, further comprising establishing that the forward program redirect construct has selected the forward branch path.

5. The method of claim 1, further comprising fetching a next instruction from an instruction cache coupled to the instruction queue when the current path differs from the previous path.

6. The method of claim 1, wherein issuing the next instruction from the instruction queue further comprises determining whether the next instruction is in the instruction queue by evaluating whether the T-bit field of the forward program redirect construct is set in response to a previous selection of the forward branch path.

7. The method of claim 1, further comprising:
issuing a backward program redirect construct from the instruction queue, wherein the backward program redirect construct is to select one of a second sequential path and a backward branch path;
when the backward branch path is selected, determining whether a target instruction associated with the backward branch path is stored in the instruction queue; and
issuing the target instruction from the instruction queue when the target instruction is stored in the instruction queue.

8. The method of claim 7, further comprising fetching the target instruction from an instruction cache coupled to the instruction queue when the target instruction is not stored in the instruction queue.

9. An integrated circuit comprising:
a first memory structure;
a second memory structure coupled to the first memory structure and operable to:
store program instructions fetched from the first memory structure;
identify a repeated issuance of a forward program redirect construct;
issue a next program instruction stored in the second memory structure in response to a current resolution of the forward program redirect construct that is identical to a last resolution of the forward program redirect construct and that is independent of a count of program loop iterations;
issue a backward program redirect construct stored in the second memory structure;
determine whether a target instruction of the backward program redirect construct is stored in the second memory structure;
issue the target instruction when the target instruction is stored in the second memory structure; and
fetch the target instruction from the first memory structure when the target instruction is not stored in the second memory structure,
wherein the second memory structure comprises a plurality of program instruction entries to store the program instructions, wherein each program instruction entry includes an associated address and an associated control entry, wherein the associated control entry comprises a T-bit field storing a value of set or reset, the value to indicate whether the current resolution of the forward branching instruction is identical to the last resolution of the forward branching instruction.

10. The integrated circuit of claim 9, wherein the first memory structure has a first access speed and the second memory structure has a second assess speed, wherein the first access speed is less than the second access speed.

11. The integrated circuit of claim 9, wherein the program instructions stored in the second memory structure are predecoded.

12. The integrated circuit of claim 9, wherein instruction decoding logic is not used for the program loop iterations.

13. The integrated circuit of claim 9, further comprising a third memory structure from which the first memory structure is operable to fetch selected program instructions.

14. A method of executing instructions in a processor that includes an instruction cache, an instruction queue, and an execution engine, the method comprising:
determining that a current resolution of a forward program redirect construct is identical to a last resolution of the forward program redirect construct, wherein a number of loop iterations associated with the instructions is unspecified prior to execution of the instructions;
issuing an instruction into the execution engine from the instruction queue without fetching the instruction from the instruction cache in response to the determination; and
upon execution of the forward program redirect construct, storing an indicator of the current resolution of the forward program redirect construct, wherein the indicator comprises a bit field stored in the instruction queue, the bit field associated with the forward program redirect construct.

15. The method of claim 14, wherein the instructions stored in the instruction queue are predecoded.

16. The method of claim 14, wherein instruction decoding logic is not used for the loop iterations.

17. The method of claim 14, further comprising determining that a stored indicator associated with the last resolution has an indicator value of set.

18. The method of claim 14, further comprising:
determining that the instruction queue includes a backward program redirect construct within an iterative loop, wherein a number of loop iterations associated with the iterative loop is unspecified prior to execution of the iterative loop;
when a branching path of the backward program redirect construct is taken and a target instruction associated with the backward program redirect construct resides in the instruction queue, reading the target instruction from the instruction queue without fetching the target instruction from the instruction cache.

19. The method of claim 18, further comprising, when the branching path of the backward program redirect construct is taken and the target instruction resides in the instruction cache, reading the target instruction from the instruction cache.

20. The method of claim 18, further comprising fetching the target instruction from an instruction cache coupled to the instruction queue when the target instruction is not stored in the instruction queue.

21. A method of issuing a next instruction of a program, the method comprising:
issuing a forward program redirect construct from an instruction queue, wherein the forward program redirect construct is to select a current path from one of a first sequential path and a forward branch path, wherein a number of loop iterations associated with the program is unspecified prior to execution of the program; and issuing a next instruction from the instruction queue when the current path is identical to a previous path selected by the forward program redirect construct, wherein issuing the next instruction from the instruction queue further comprises determining whether the next instruction is in the instruction queue by evaluating whether a T-bit field of the forward program redirect construct is set in response to a previous selection of the forward branch path.

22. The method of claim 21, further comprising setting the T-bit field of the forward program redirect construct when the forward branch path is selected.

23. The method of claim 21, further comprising determining whether the current path is identical to the previous path, wherein determining comprises:

establishing that the T-bit field of the forward program redirect construct is set in response to the forward branch path selected previously.

24. The method of claim 21, further comprising establishing that the forward program redirect construct has selected the forward branch path.

25. The method of claim 21, further comprising fetching a next instruction from an instruction cache coupled to the instruction queue when the current path differs from the previous path.

26. The method of claim 21, wherein the next instruction is predecoded.

27. The method of claim 21, further comprising:

issuing a backward program redirect construct from the instruction queue, wherein the backward program redirect construct is to select one of a second sequential path and a backward branch path;

when the backward branch path is selected, determining whether a target instruction associated with the backward branch path is stored in the instruction queue; and issuing the target instruction from the instruction queue when the target instruction is stored in the instruction queue.

28. The method of claim 27, further comprising fetching the target instruction from an instruction cache coupled to the instruction queue when the target instruction is not stored in the instruction queue.

* * * * *

UNITED STATES PATENT AND TRADEMARK OFFICE
CERTIFICATE OF CORRECTION

| | |
|---|---|
| PATENT NO. | : 7,685,411 B2 |
| APPLICATION NO. | : 11/104115 |
| DATED | : March 23, 2010 |
| INVENTOR(S) | : Ahmed et al. |

Page 1 of 1

It is certified that error appears in the above-identified patent and that said Letters Patent is hereby corrected as shown below:

Column 7, line 12, claim 5: "a next instruction" to read as --the next instruction--

Column 7, line 67, claim 9: "the forward branching instruction" to read as --a forward branching instruction--

Column 10, line 2, claim 25: "a next instruction" to read as --the next instruction--

Signed and Sealed this
Fifth Day of July, 2011

David J. Kappos
*Director of the United States Patent and Trademark Office*